United States Patent Office 3,533,959
Patented Oct. 13, 1970

3,533,959
REACTIVATION OF SPENT CRYSTALLINE
ALUMINOSILICATE CATALYSTS WITH
CHELATING AGENTS
Joseph N. Miale and Richard J. Mikovsky, Trenton, N.J., assignors to Mobil Oil Corporation, a corporation of New York
No Drawing. Filed Mar. 30, 1966, Ser. No. 538,599
Int. Cl. B01j 11/02
U.S. Cl. 252—414                              7 Claims

ABSTRACT OF THE DISCLOSURE

A method for reactivating spent aluminosilicate catalysts damaged by exposure to heat or steam by contacting the same with a cation-containing agent capable of chelating with aluminum, at a pH between about 7 and 9.

---

This invention relates to a process for reactivating spent catalyst composites useful for converting hydrocarbons. More particularly, the invention is directed to a method for reactivating spent crystalline aluminosilicate catalysts which have become damaged due to excessive heat and/or steam during hydrocarbon conversion operations, or by other means.

Zeolitic materials, both natural and synthetic, have been demonstrated in the past to have catalytic capabilities for the conversion of organic materials. Such zeolitic materials are ordered, porous crystalline aluminosilicates having a definite crystalline structure within which there are a large number of small cavities which are interconnected by a number of small cavities which are interconnected by a number of still smaller channels. Since the dimensions of these pores are such as to accept for adsorption molecules of certain dimensions while rejecting those of larger dimensions, these materials have become known as "molecular sieves" and are utilized in a variety of ways to take advantage of these properties.

Such molecular sieves include a wide variety of positive-ion-containing crystalline aluminosilicates, both natural and synthetic. These aluminosilicates can be described as a rigid three dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio of Al to the number of the various cations, such as Ca/2, Sr/2, Na, K or Li, is equal to unity. One cation may be exchanged either in entirety or partially by another cation utilizing conventional ion-exchange techniques. By means of such cation exchange, it is possible to vary the size of the pores in a given aluminosilicate by suitable selection of the particular cation. The spaces between the tetrahedra are occupied by molecules of water prior to dehydration. The zeolite is dehydrated to activate it for use as a catalyst.

A description of such aluminosilicates, methods for their preparation and examples of their use are found in U.S. Pats. 2,882,243, 2,971,824, 3,033,778 and 3,130,007.

Commercial catalytic cracking is carried out by contacting a hydrocarbon charge in the vapor or liquid state with a catalyst of the foregoing type under conditions of temperature, pressure, and time to achieve substantial conversion of the charge to lower boiling hydrocarbons. This cracking reaction results in deposition of a carbonaceous deposit commonly called "coke" with consequent decline in catalytic activity of the catalyst. Under conditions to obtain efficient operation from a yield standpoint, it is found desirable to terminate the cracking reaction after a relatively short conversion run, for example, of from 5 to 15 minutes on stream, and thereafter to restore the activity of the catalyst by burning off the coke in a regeneration stage. The formation of coke represents a net loss, since hydrocarbons are consumed in its production. In addition, it is apparent that the greater the coke deposit, the longer the regeneration period would have to be in order not to exceed detrimental temperature levels during regeneration.

When zeolite catalysts are activated by coke deposits, they are, as mentioned above, reactivated by conventional air regeneration. When a zeolite is subjected to such excessive uncontrolled heat as in regeneration and also subjected to the steam of the catalytic reactor, it is believed its crystal lattice experiences strains or hydrolysis which breaks many of the network bonds. Aluminum is driven from the framework to cationic positions or, due to local pH conditions, it may agglomerate as alumina or hydrated alumina within the channels. Activity is especially diminished, among other reasons, by loss of active catalytic sites due to plugging of the channels. Whatever the exact mechanism is that occurs is not certain, but one thing is certain, there is a substantial loss of activity after the catalyst has encountered exposure to excessive heat and/or steam environment.

It is, therefore, an object of this invention to provide a method for reactivating spent crystalline aluminosilicate catalysts damaged by exposure to heat or steam. It is another object to provide a method for reactivating spent crystalline aluminosilicate catalysts which will be effective in restoring activity and at the same time be relatively simple and economical.

In accordance with the present invention, a method has now been discovered for reactivating spent crystalline aluminosilicate catalysts damaged by exposure to heat or steam which comprises contacting the spent catalyst with a cation-containing agent capable of chelating with aluminum at a pH between about 7 and 9, preferably 7 to 8.

Chelation removes the alumina deposits which are now believed to be present as amorphous agglomerates in the zeolite channels. If the pH of the reaction mixture is too low, the lattice will be attached and result in destruction of the sieve. This destruction is avoided by starting with neutral or slightly alkaline solutions.

While contact time with the chelating agent may be for periods up to twenty-four hours, this is not necessary and time consuming since contact times as low as thirty minutes work quite well, and preferably about ninety minutes.

While any cation-containing chelating agent capable of combining with aluminum such as ammonium hydroxide, sodium hydroxide, or the like will be effective in the practice of this invention, it is preferred to use the ammonium salts of ethylenediaminetetraacetic acid and preferably diammonium dihydrogen ethylenediaminetetraacetate, while of course maintaining the pH of the mixture at a pH about 7 or higher.

The crystalline aluminosilicates which may be reactivated according to the manner of the invention may be any one of the well-known zeolitic materials, as described above, such as, for example, but not by way of limitation, zeolite A, zeolite X, zeolite Y and zeolite L to name a few. After treatment with the chelating agent, the zeolite is base exchanged, if necessary, to restore the original metal cations present and maintain crystallinity of the structure. Contemplated as well, within the scope of the invention are the cation exchanged derivatives of these crystalline aluminosilicates, exemplary cations being divalent metals such as calcium, or trivalent metals such as the rare earths. Also included within the scope of the invention are such commercial cracking catalyst composites comprising a crystalline aluminosilicate contained in and distributed throughout an inorganic oxide matrix, as described in U.S. 3,140,249.

The invention will be described further in connection with the following specific examples, but it is to be understood that these are merely illustrative in nature and not intended to limit the invention thereto.

EXAMPLE 1

A sample of rare earth exchanged hydrogen zeolite X (hereinafter referred to as REHX), prepared by exchange of NaX with a solution of rare earth ions and ammonium ions (5 wt. percent $RECl_3$, $6H_2O+2$ wt. percent $NH_4Cl$) and subsequent calcination, was steamed for 24 hours at 1200° F. in a static bed with 100% steam at atmospheric pressure. A 4 g. portion of the steamed catalyst was treated with 100 ml. 0.25 M diammonium dihydrogen ethylenediaminetetraacetate for 90 minutes at reflux temperature. The pH, during this treatment, dropped from 7.4 to 6.1. The catalyst was washed with 750 ml. water and dried for one hour at 105° C. It was calcined in air for three hours at 1000° F. Analyses are shown in Table I, below. Portions of the three catalysts were tested for n-hexane cracking activity ($\alpha$)[1] see Table II, below.

EXAMPLE 2

A 40 ml. sample of a low activty, steam-aged commercial working catalyst containing between 5 to 90 wt. percent of a rare earth exchanged crystalline aluminosilicate contained in and distributed throughout a silica-alumina gel matrix and prepared by the procedure as described in U.S. 3,140,249, was treated with 200 ml. of 0.25 M diammonium dihydrogen ethylene-diaminetetraacetate, washed and dried in the manner according to Example 1. The catalyst was tested for n-hexane cracking activity and "CAT C"[2] conversion. Results are summarized in Table II.

EXAMPLE 3

A 40 ml. sample of another low-activity heat-damaged catalyst as in Example 2 was treated according to the procedure of Example 2, and tested for n-hexane cracking activity and "CAT C" conversion. For results see Table II, below.

TABLE I

| Example 1 | Na, Percent | $SiO_2$, Percent | $Al_2O_3$, Percent | $Si_2/Al_2O_3$ | RE, Percent |
|---|---|---|---|---|---|
| Steamed REHX | | 42.4 | 28.9 | 2.49 | 26.5 |
| Reactivated REHX | | 43.6 | 26.5 | [1] 2.80 | |

[1] This indicates that over 10% $Al_2O_3$ had been removed from the zeolite framework by the heat and steam damage. This amount would normally cause a collapse of non-rare earth X type faujasite, and that is why as mentioned heretofore, following treatment with the chelating agent of this invention, metal cations originally present in the structure are restored by base exchange of the appropriate cation, if necessary.

[1] Cracking activity is obtained by a standard $\alpha$-test which is fully described in a letter to the Editor entitled "Superactive Crystalline Aluminosilicate Hydrocarbon Catalysts" by P.B. Weisz and J. N. Miale appearing in "Journal of Catalysts," vol. 4, No. 4, August 1965, pp. 527–529.
[2] The conditions of the CAT-C test are—Gas oil. A full range mid-continent gas oil having the following properties:

Vol. percent on crude _____ 44–89
    Gravity, API _____ 29.6
    Aniline No., ° F. _____ 181
    S, wt. percent _____ 0.52
    N, wt. percent _____ 0.046
    Pour point, ° F. _____ 80
    Carbon residue, wt. percent _____ 0.19
    Ni, p.p.m. _____ 9.17
    Cu, p.p.m. _____ 0.46
    V, p.p.m. _____ 0.26
    $H_2$, wt. percent _____ 12.77

Temperature. 900° F.
Liquid hourly space velocity (LHSV). 2.
Catalyst-oil ratio (vol.) (C/O), 3.
On-stream time, 10 minutes.

TABLE II

| Example | (n-hexane cracking activity) | CAT C conversion, vol. percent |
|---|---|---|
| (1) Fresh REHX | 8,000 | |
| Steamed REHX | 20 | |
| Reactivated steamed REHX | 42,000 | |
| (2) Steam damaged commercial catalyst | 0.7 | 33.9 |
| Reactivated steam damaged commercial catalyst | 2.7 | 36.3 |
| (3) Heat damaged commercial catalyst | 0.1 | 18.0 |
| Reactivated heat damaged commercial catalyst | 0.3 | 20.9 |

As can be seen by the above data, the activity of the reactivated catalysts is increased significantly over the steam damaged catalysts. For instance, as noted, $\alpha$-values are increased by at least three fold up to several thousand fold using the procedure of this invention. CAT C conversion values are also seen to increase significantly after reactivation treatment.

While generally the practice of this invention involves reactivating cracking catalysts damaged by heat or steam during hydrocarbon conversion operations, it is contemplated as within the scope of the invention to reactivate fresh catalyst compositions which have been damaged and become spent by exposure to heat or steam or by any other means.

What is claimed is:

1. A method for reactivating a spent conversion catalyst comprising a crystalline aluminosilicate damaged by exposure to excessive heat or steam containing entrained alumina which comprises contacting said spent catalyst with a cation-containing agent capable of chelating with aluminum, at a pH between about 7 and about 9, said agent selected from the group consisting of ammonium salts of ethylenediaminetetraacetic acid and diammonium dihydrogen ethylenediaminetetraacetate.

2. A method according to claim 1 wherein said spent catalyst has been damaged by exposure to heat or steam during catalytic cracking of a hydrocarbon charge.

3. A method according to claim 1 wherein said spent catalyst comprises a crystalline aluminosilicate contained in and distributed throughout an inorganic oxide matrix.

4. A method according to claim 1 wherein the resultant reactivated catalyst is contacted with a metal cation-containing solution so that metal cations originally present in said crystalline aluminosilicate are restored to its crystal structure.

5. A method according to claim 1 wherein said crystalline aluminosilicate is a metal cation exchanged crystalline aluminosilicate.

6. A method according to claim 5 wherein said metal cation is selected from the rare earth elements.

7. A method according to claim 6 wherein said crystalline aluminosilicate is a rare earth cation-exchanged X-type zeolite.

References Cited

UNITED STATES PATENTS

| | | | |
|---|---|---|---|
| 3,442,795 | 5/1969 | Kerr et al. | 252—455 XR |
| 3,392,111 | 7/1968 | Napier et al. | 252—414 |
| 3,321,521 | 5/1967 | Kerr | 252—455 |
| 3,151,058 | 9/1964 | Erickson | 208—113 |
| 2,889,287 | 6/1959 | Scott | 252—455 |
| 3,368,981 | 2/1968 | Plank | 252—455 |
| 3,374,056 | 3/1968 | Maher | 23—112 |

OTHER REFERENCES

Inorganic Chemistry, Philips and Williams, 1966, vol. II, pp. 82–87.

DANIEL E. WYMAN, Primary Examiner

P. E. KONOPKA, Assistant Examiner

U.S. Cl. X.R.

208—111, 120; 252—411

PO-1050
(5/69)

UNITED STATES PATENT OFFICE
CERTIFICATE OF CORRECTION

Patent No. 3,533,959      Dated October 13, 1970

Inventor(s) Joseph N. Miale and Richard J. Mikovsky

It is certified that error appears in the above-identified patent and that said Letters Patent are hereby corrected as shown below:

Column 1, line 63,    "use" should be --uses--.
Column 2, line 12,    "activated" should be --deactivated--.
Column 2, line 44,    "attached" should be --attacked--.
Column 3, line 63,    "Catalysts" should be --Catalysis--.
Column 3, line 70,    "9.17" should be --0.17--.
Column 4, line 4,    before "(n-hexane cracking activity)" insert -- $\alpha$ --.

Signed and sealed this 4th day of May 1971.

(SEAL)
Attest:

EDWARD M. FLETCHER, JR.
Attesting Officer

WILLIAM E. SCHUYLER, JR.
Commissioner of Patents